United States Patent
Scholzen et al.

(10) Patent No.: US 10,001,106 B2
(45) Date of Patent: Jun. 19, 2018

(54) SENSOR MODULE FOR A PRESSURE-MEASURING SHEATHED-ELEMENT GLOW PLUG

(71) Applicant: Robert Bosch GmbH, Stuttgart (DE)

(72) Inventors: Holger Scholzen, Stuttgart (DE);
Juergen Krueger, Heilbronn (DE);
Anke Maier-Schleich, Leutenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 25 days.

(21) Appl. No.: 14/910,243

(22) PCT Filed: Jul. 17, 2014

(86) PCT No.: PCT/EP2014/065372
§ 371 (c)(1),
(2) Date: Feb. 4, 2016

(87) PCT Pub. No.: WO2015/022139
PCT Pub. Date: Feb. 19, 2015

(65) Prior Publication Data
US 2016/0186712 A1    Jun. 30, 2016

(30) Foreign Application Priority Data
Aug. 12, 2013 (DE) .................. 10 2013 215 860

(51) Int. Cl.
*F02P 19/02* (2006.01)
*G01L 23/10* (2006.01)
(Continued)

(52) U.S. Cl.
CPC ............ *F02P 19/028* (2013.01); *F23Q 7/001* (2013.01); *G01L 9/08* (2013.01); *G01L 23/10* (2013.01);
(Continued)

(58) Field of Classification Search
CPC .. F02P 19/028; F23Q 7/001; F23Q 2007/005; G01L 9/08; G01L 23/10; G01M 15/08; F02D 35/023
See application file for complete search history.

(56) References Cited

U.S. PATENT DOCUMENTS

| | | | |
|---|---|---|---|
| 6,309,589 B1* | 10/2001 | Knoll | C04B 35/58092 264/614 |
| 2009/0314061 A1* | 12/2009 | Kern | F23Q 7/001 73/35.12 |
| 2012/0234084 A1* | 9/2012 | Ledermann | G01D 11/245 73/114.18 |

FOREIGN PATENT DOCUMENTS

| CN | 1734076 A | 2/2006 |
|---|---|---|
| CN | 101128723 A | 2/2008 |

(Continued)

OTHER PUBLICATIONS

International Search Report for PCT/EP2014/065372, dated Oct. 1, 2014.

*Primary Examiner* — Ryan Walsh
(74) *Attorney, Agent, or Firm* — Norton Rose Fulbright US LLP; Gerard Messina (57) ABSTRACT

A sensor module having a sensor housing, at least one piezoelectric converter element that is disposed in the sensor housing, and at least one insulating member that is disposed in the sensor housing alongside the converter element. The insulating member has on its outer periphery at least one recess in which a contacting system of the converter element extends. A pressure-measuring glow plug having a sensor module of this kind is also described.

12 Claims, 4 Drawing Sheets

(51) Int. Cl.
 *G01L 9/08* (2006.01)
 *G01M 15/08* (2006.01)
 *F23Q 7/00* (2006.01)
 *F02D 35/02* (2006.01)
(52) U.S. Cl.
 CPC .......... *G01M 15/08* (2013.01); *F02D 35/023* (2013.01); *F23Q 2007/005* (2013.01)

(56) References Cited

FOREIGN PATENT DOCUMENTS

| | | |
|---|---|---|
| DE | 10 2009 026436 | 12/2010 |
| DE | 10 2010 038798 | 2/2012 |
| DE | 10 2011 088474 | 6/2013 |
| JP | 2011 144978 | 7/2011 |
| WO | WO 2010/136229 | 12/2010 |
| WO | WO 2014/067722 | 5/2014 |

* cited by examiner

SENSOR MODULE FOR A PRESSURE-MEASURING SHEATHED-ELEMENT GLOW PLUG

BACKGROUND INFORMATION

The present invention relates to a sensor module for a pressure-measuring glow plug or pressure-measuring sheathed-element glow plug, and more precisely to a combustion chamber pressure sensor module having a space-optimized insulating body for a pressure-measuring glow plug for placement in a chamber of a compression-ignition internal combustion engine, for example a pre-chamber, swirl chamber, or combustion chamber of an air-compressing compression-ignition diesel engine, of a compression-ignition HCCI gasoline engine, or also of a "normal" gasoline engine. The present invention furthermore relates to a pressure-measuring glow plug having a sensor module of this kind, or alternatively thereto to a standalone compression chamber pressure sensor having a sensor module of this kind.

Because laws are continually becoming more stringent with regard to the fuel consumption and resulting pollutant emissions of internal combustion engines, especially in the automotive sector, further developments in combustion control and in the associated control components are necessary. The combustion chamber pressure, which plays a decisive role in achieving optimum combustion in the combustion chamber of compression-ignition internal combustion engines or in an Otto-cycle process, has very recently been identified as a decisive factor in combustion which must be optimized. Combustion chamber pressure sensors must then be provided in the combustion chamber of the internal combustion engine in order to measure this.

An example of a standalone combustion chamber pressure sensor for a gasoline engine is described in German Patent Application No. DE 10 2009 026 436 A1. In this application, an apparatus for detecting a combustion chamber pressure of a gasoline engine is described, in which apparatus an opening, facing toward the combustion chamber, of a combustion chamber pressure sensor housing is closed off with a membrane. A mechanical-electrical converter element, also called a piezoelectric converter element, is disposed behind the membrane in the interior of the sensor housing, a combustion chamber pressure being transferred via the membrane to the converter element with the aid of a transfer element that is made at least in part of a heat-insulating material, in order to prevent or decrease thermal damage to the converter element and to the associated electrical leads as a result of combustion chamber heat.

Combustion chamber pressure sensors as described above disposed in standalone fashion, however, require physical actions to reconfigure the conventional combustion chambers of internal combustion engines, and need additional installation space. It is preferable, however, for combustion in the combustion chamber to be influenced as little as possible by such reconfiguration actions. Already located in the combustion chambers of conventional diesel engines, as a cold-starting aid, is at least one respective electrically heatable glow plug (GLP) with which the diesel engine is preheated in the starting phase. Glow plugs can have a heating element made of metal or ceramic, also called a glow element. Glow plugs of this kind continue to be widely used in glow plug engines or as a cold-starting aid when starting oil heating systems and gas turbines operated with kerosene. Solutions in which the combustion chamber pressure sensor is integrated into the glow plug in the combustion chamber have been proposed in the past in order to address the problems recited above. An example of a so-called pressure-measuring glow plug of this kind is described in German Patent Application No. DE 10 2011 088 474 A1 in which, in a glow module of the pressure-measuring glow plug, a combustion chamber pressure is received by a glow tube disposed in a cylindrical transfer element and is transferred from the transfer element, via a round pressure piece, to a circular pressure sensor in the form of a piezoelectric converter element. The pressure sensor is secured in the glow module housing with a fixed countermember. Contacting of the glow tube takes place via a connector bolt and an associated electrical lead that extends through a central bore in the pressure sensor and in the pressure piece.

As a result of the central contacting system, however, the solution described above by way of a pressure-measuring glow plug is extremely complex in terms of manufacture because of the manufacturing steps of drilling the central bore and creating the round shape of the pressure sensor, entailing high costs for assembly of the sheathed-element glow plug.

SUMMARY

In accordance with the present invention, a sensor module of a pressure-measuring glow plug is provided, preferably for a compression-ignition internal combustion engine or also a spark-ignited internal combustion engine. More precisely, an example sensor module according to the present invention has, inter alia, a sensor housing as well as at least one piezoelectric converter element disposed in the sensor housing, and at least one insulating member that is likewise disposed in the sensor housing alongside the converter element. The insulating member is provided, as a thermal protection insulator, in order to protect the converter element from the effect of high temperature as a result of the combustion chamber temperature and, as an electrical insulator, to impart elevated dielectric strength and high electrical surface resistance to the converter element. The insulating member can be made in particular of a ceramic material, preferably of aluminum oxide ($Al_2O_3$). In order to enable contacting of the converter element, i.e., electrical connection to the piezoelectric converter element for the measurement of forces acting on the converter element, there is provided in the insulating member on its outer periphery at least one recess in which the electrical contacting system of the converter element extends, preferably in the form of one or more cables with which the converter element is contacted.

A "piezoelectric converter element" is, in general, an element that can convert mechanical effects, for example the action of a force that causes a change in the length of the converter element, into electrical signals. The converter element here is preferably a piezoceramic or a quartz material such as silicon dioxide ($SiO_2$). Alternatively or additionally, however, the piezoelectric converter element can also encompass other types of mechanical-electrical converter elements that are configured to convert mechanical signals into electrical signals. Because a supply lead to a pressure transducer, for example to a glow element of a pressure-measuring glow plug, can be guided in the context of the present invention laterally past the sensor module, in particular past the piezoelectric converter element, as a result of the at least one recess, the converter element can be embodied in particular in full-coverage fashion, for example as a full-coverage cuboidal element having no central opening, or alternatively thereto as a disk having a polygonal cross section, or the like. Energy transfer between the pressure transducer and converter element is preferably implemented by the fact that at least one transfer element, for example in the form of a further insulating member, is furthermore disposed between a receiving component of the glow element and the piezoelectric converter element, for energy transfer from the receiving component to the converter element. An energy transfer of this kind can encompass in principle the transfer of forces, pressures, motions, or similar changes of state brought about by the combustion chamber pressure. The transfer element can be in particular of rod-shaped or also annular configuration.

Because the supply lead to the pressure transducer is guided past by way of the at least one recess, it is possible to use a piezoelectric converter element whose manufacture is much more inexpensive than the manufacture of, for example, a round converter element having a central bore. In addition, considerably enhanced installation compatibility of the individual components in the sensor, and of the sensor module itself and of the further components of the corresponding pressure-measuring glow plug therein, can be achieved with the proposed sensor module.

According to a preferred refinement of the example sensor module according to the present invention, the insulating member has a substantially square shape having a recess on each side. This yields a symmetrical shape for the insulating member, with the advantage that corresponding manufacture of the insulating member is achieved and inadvertent incorrect installation of the insulating member into the sensor module can be prevented, since each side of the square shape of the insulating member is of identical configuration. This type of conformation of the insulating member meets the requirements of the "poka-yoke" principle, which encompasses technical safeguards or devices for immediate discovery and prevention of errors. With a symmetrical form of this kind, the contacting system of the converter element preferably extends in two recesses of the insulating member. When electrically conductive cables are used as a contacting system, this means that the cable connected to the positive side of the piezoelectric converter element can extend in one recess of the insulating member, and the cable connected to the negative side of the piezoelectric converter element in another recess of the insulating member. With a symmetrically constructed insulating member, i.e., an insulating member having four recesses, two recesses thus remain unoccupied and other leads can extend in them, for example the supply lead, already mentioned above, to the pressure transducer of the pressure measurement sensor. Also preferably, the substantially square insulating member has rounded corners, so that the insulating member can be inserted with only a little clearance into the circular interior of the hollow-cylindrical sensor housing, and a distance remains between the straight portions of the cuboidal sides of the insulating member and the inner periphery of the sensor housing. The rounding profiles of the rounded corners of the insulating member, i.e., the curvature of the curve profiles of the respective roundings of the corners, preferably lie on the same circumference, which allows optimum insertion of the insulating member into the hollow-cylindrical sensor housing.

Also preferably, the at least one recess has a rounded shape, for example, the shape of a lower part of a semicircle. The transitions between the semicircular recess and the straight side surfaces of the cuboidal insulating member can likewise be rounded in order to avoid any sharp edges that may occur. Alternatively thereto, the recesses can also have a polygonal shape, which can have functional advantages as compared with the rounded shape. As a result of the conformation features described above, the insulating member takes on a substantially X-shaped form. The outer contour of the insulating member is thus configured in such a way that interactions with neighboring components both external to the sensor module and within the sensor module are space-optimized. At the same time, the outer contour of the insulating member is configured so that the space-optimized configuration can be supported by a suitable assembly process.

With reference to the conformation of the insulating member as described above, it is preferable that the converter element have a substantially square shape. A square converter element has the advantage that it can be manufactured inexpensively without requiring additional manufacturing steps, for example drilling a central hole. Also preferably, upon placement of the insulating member and the converter element in the sensor housing of the sensor module, at least one contact element is disposed between the insulating member and converter element, so that a charge signal that is generated by the converter element upon application of a force thereonto can be received by the contact element and transmitted, via the contacting system to which the contact element is connected, to an evaluation device or the like, for example a signal processing unit of an electronic module of the pressure-measuring glow plug, for evaluation of the charge signal. The contact element has a contact plate as well as a contact arm, the contact plate coming into abutment with a base surface of the converter element and the contact arm being disposed in a recess of the insulating member. The contact plate of the contact element furthermore has at least one recess that coincides with the at least one recess in the insulating member.

According to a preferred refinement of the present invention, the sensor housing has a hollow-cylindrical shape, i.e., the conformation of a hollow cylinder whose ends are open and thus furnish an interior space open toward the outside. A cover element is preferably provided at each open end of the hollow-cylindrical sensor housing in order to close off the interior space in principle from the outside, and to enclose in the interior of the sensor housing the components disposed therein, for example the converter element and the at least one insulating member, and in some cases to secure them therein. Each cover element has at least one recess on its outer periphery, so that the interior space of the sensor housing is not closed off completely from the outside. With the sensor module in the assembled state, the recess is positionally coincident with one of the recesses in the insulating member so that a continuous, peripherally closed conduit is formed through the cover element, the insulating member, and the inner periphery of the sensor housing. Preferably each cover element has a symmetrical shape, meaning that each cover element has at least two recesses that are disposed opposite one another.

Also preferably, the sensor module has a further insulating member that has a conformation identical to that of the insulating member previously described. In the installed state the converter element is disposed between the two insulating members; in a preferred embodiment the components of the sensor module are disposed in the sequence: cover element, insulating member, contact element, converter element, contact element, insulating member, cover element. Thanks to the recesses provided in the respective components, i.e., the respective recess in the cover element, insulating member, and contact element, and thanks to the "small" conformation of the converter element, a continuous conduit is produced between the components and the inner wall of the sensor housing, in which a cable or the like can be guided. The further insulating member is preferably provided for pressure transfer to the converter element; a pressure-transferring component can transfer compressive forces to the further insulating member, which transfers them in turn to the converter element. The insulating-member shape having its outer contour described above is physically simple to extrude, thus producing a simple component. Insulating member manufacture, i.e., the manufacture of the at least one insulating member or of the further insulating member, can therefore be implemented by way of a cold-pressing operation; any other manner of manufacturing a ceramic shaped element can also be utilized, for example the ceramic injection molding (CIM) method.

According to a further aspect of the present invention, a pressure-measuring glow plug is furnished, which has a housing; an electronics module disposed in the housing; a sensor module as described above disposed in the housing; and a glow element disposed at least in part outside the housing, which element is mechanically connected to the sensor module. This means that a combustion chamber pressure that is to be measured is transferred via the glow element to the sensor, and more precisely via the further insulating member to the converter element; that pressure is converted by the converter element into a charge signal which is then conveyed by the contacting system out of the sensor module and to the electronics module, with which the charge signal can be evaluated. A contacting system between the glow element and electronics module, which besides an evaluation unit for evaluating the charge signal can also have a control unit for controlling heating of the glow element, extends at least in part in an internally peripheral conduit of the sensor module which is constituted by the respective externally peripheral recess of at least the cover element and insulating member. It is thereby possible to cause the contacting system of the glow element to extend inside the sensor module instead of outside the sensor module, with the result that an installation space for the overall pressure-measuring glow plug can be decreased in terms of its diameter.

The example sensor module according to the present invention and the insulating member disposed therein make possible an inexpensive sensor module configuration, since the use of the space-optimized insulating member allows the use of an inexpensive piezoelectric converter element having a square cross section. In addition, due to the special conformation of the insulating member as described above, a radial nesting of the adjacent components is achieved, so that a smaller overall diameter of the sensor module, and thus a smaller installation space required by the pressure-measuring glow plug, can be achieved. Furthermore, because of the shape of the space-optimized insulating member with rounded corners and straight side surfaces, optimum insertion into the sensor housing with lateral alignment is achieved, so that the radial location of the insulating member can be aligned using suitable apparatuses, yielding a minimization of tolerances.

BRIEF DESCRIPTION OF THE DRAWINGS

FIG. 3b is a plan view of the insulating member shown in FIG. 3a.

DETAILED DESCRIPTION OF EXAMPLE EMBODIMENTS

Figure 1:
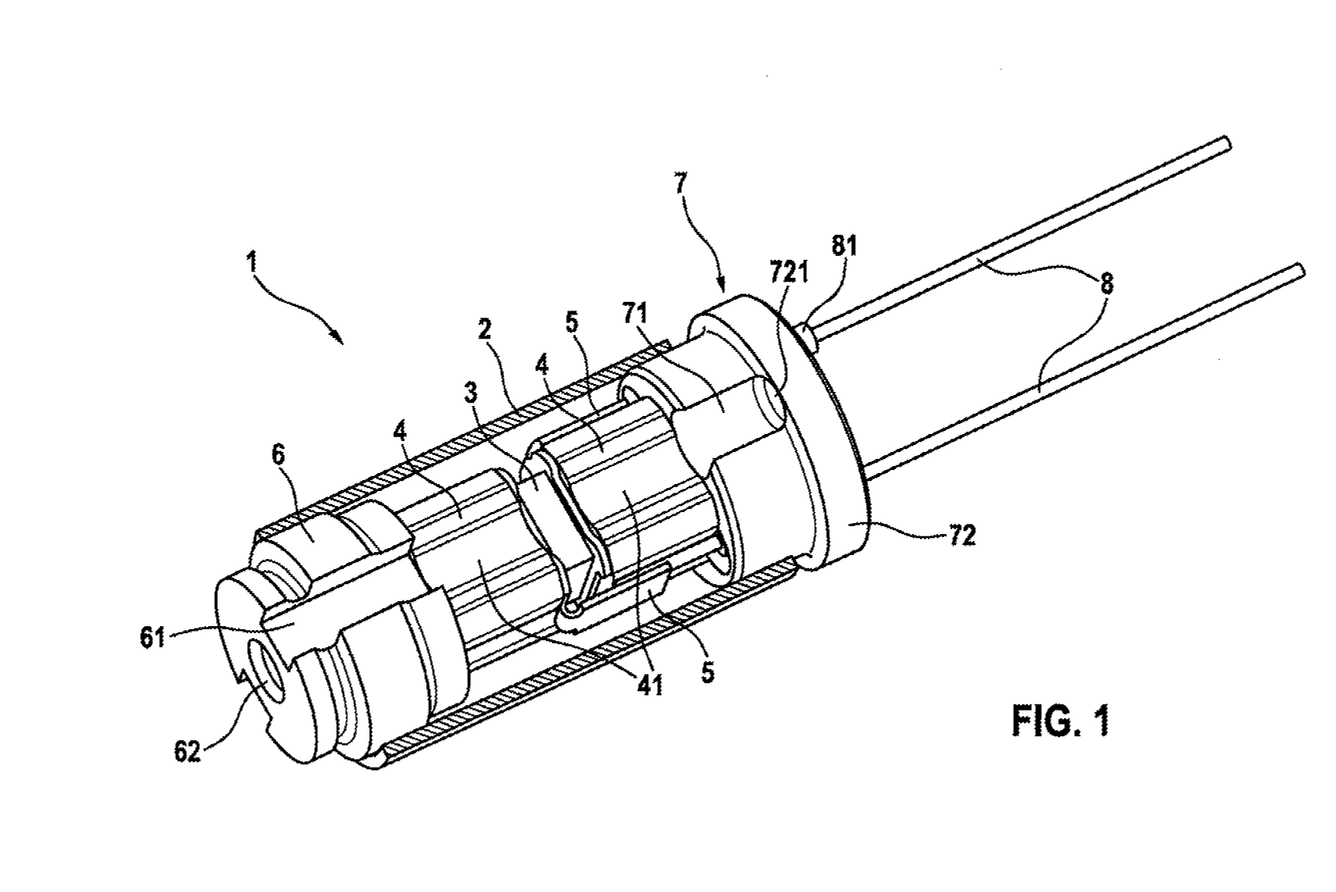
FIG. 1 is a partly sectioned perspective view of a sensor module according to a preferred embodiment of the invention.

FIG. 1 is a partly sectioned perspective view of a preferred embodiment of sensor module 1 according to the present invention. Sensor module 1 has a sensor housing 2 made preferably of steel, for example steel having the material number 1.4016, in the form of a hollow cylinder, in which a mechanical-electrical converter element 3, i.e., a converter element that can convert a mechanical change in shape into an electrical signal and vice versa, is disposed. In this embodiment, this refers in particular to a piezoelectric converter element 3 of square shape. As is also evident from FIG. 2, converter element 3 has on each of its base surfaces (as opposed to the side surfaces) an electrode 5 made preferably of steel, for example of steel having the material number 1.4301, as a contact element, each electrode 5 being made up of an electrode plate 51 constituting a contact plate and an electrode arm 52 constituting a contact arm. Provided in each electrode plate 51 is at least one recess 511 on its outer periphery, here in the form of a semicircular indentation. Converter element 3, together with electrodes 5 disposed thereon, is disposed or introduced between insulating members 4. The assemblage made up of converter element 3, insulating members 4, and electrodes 5 is moreover secured in sensor housing 2 on the one side by a first securing bolt 6 that is preferably made of steel, for example having the material number 1.4301, and on the other side by a second securing bolt 7 that likewise is preferably made of steel. Securing bolts 6, 7 serve as cover elements that at least in part externally close off sensor housing 2.

Figure 4:
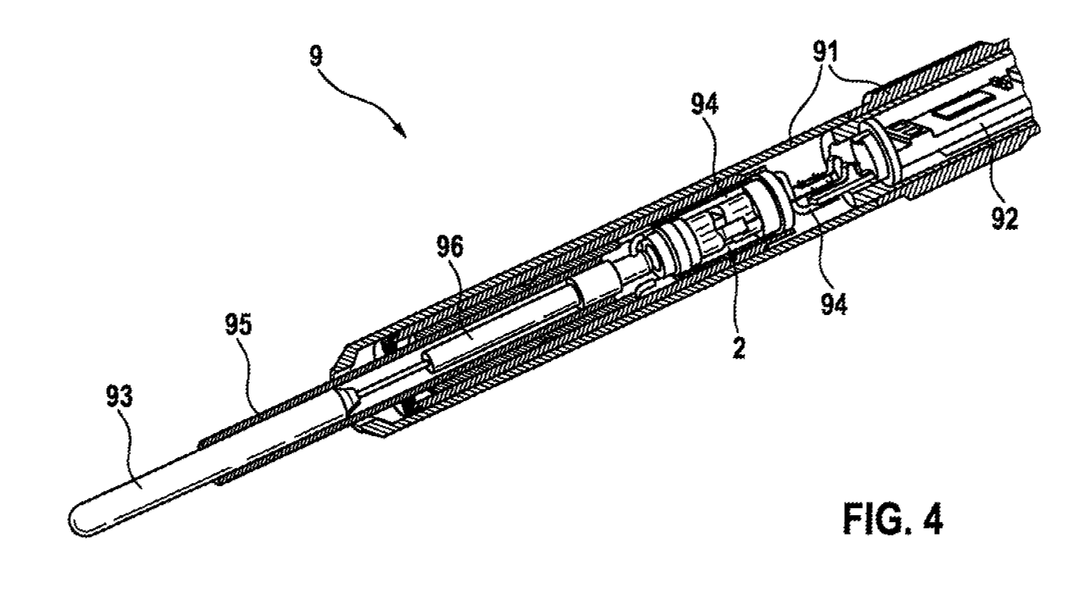
FIG. 4 shows a pressure-measuring glow plug having disposed therein the sensor module according to the preferred embodiment of the present invention.

Insulating members 4 each have a recess 41 in each side surface, i.e., on its outer periphery, a respective electrode arm 52 being bent or inflected into one of recesses 41 of insulating member 4 on the second securing bolt 7 side in such a way that the respective recess 41 is at least partly covered by electrode arm 52. Each of the securing bolts 6, 7 has on its outer periphery two recesses 61, 71 that are disposed opposite one another beyond the respective securing bolts 6, 7. Recesses 71 of second securing bolt 7 transition into an axial through bore 721 of a protrusion 72 of securing bolt 7, as is evident from FIG. 2. In addition, further axial through bores 722 that extend through the entire securing bolt 7 are provided in protrusion 72. A sensor cable 8 that is respectively connected to a corresponding electrode arm 52 of electrodes 5 is passed through in each of through bores 722. Each sensor cable 8 is disposed in the respective through bore 722 in a manner sealed by an insulator 81, made preferably of Teflon. First securing bolt 6 has, in addition to recesses 61, a central axial through bore 62. As shown in FIG. 4, for example, sensor housing 2 is usually disposed in a pressure-measuring glow plug 9 in such a way that first securing bolt 6 is disposed on that side of sensor housing 2 which faces toward the combustion chamber, and that second securing bolt 7 is disposed on that side of sensor housing 2 which faces away from the combustion chamber. First securing bolt 6 can accordingly also be referred to as the "combustion-chamber-side" securing bolt 6, and second securing bolt 7 can accordingly also be referred to as the "combustion-chamber-remote" securing bolt 7; through bore 62 in the securing bolt 6 that faces toward the combustion chamber is consequently oriented toward the combustion chamber (not shown).

Figure 2:
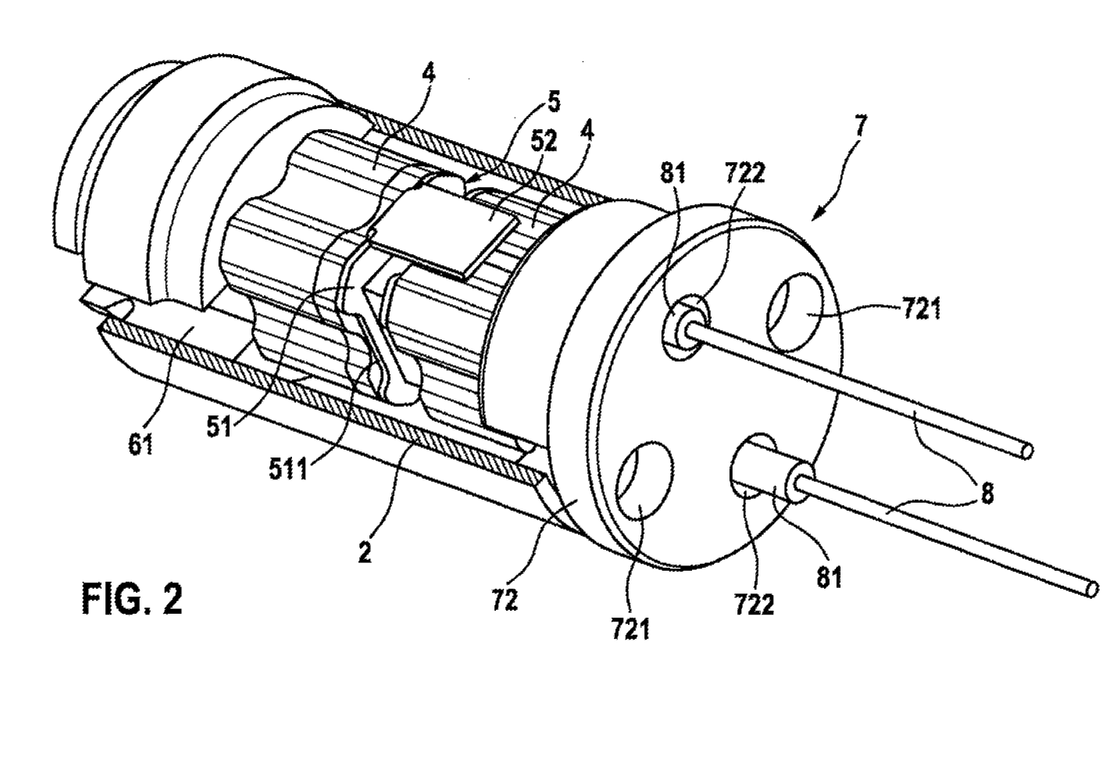
FIG. 2 shows the sensor module shown in FIG. 1 from a different perspective.

As is shown in from FIGS. 1 and 2, components 3, 4, 5, 6, 7 disposed on and in sensor housing 2 are disposed in such a way that recess 61 of combustion-chamber-side securing bolt 6, recess 41 of combustion-chamber-side insulating member 4 on the first securing bolt 6 side, recess 511 of combustion-chamber-side electrode 5 on the first securing bolt 6 side, recess 511 of combustion-chamber-remote electrode 5 on the second securing bolt 7 side, recess 41 of combustion-chamber-remote insulating member 4 on the second securing bolt 7 side, and recess 71 in combination with through bore 721 of combustion-chamber-remote securing bolt 7, form a conduit that passes through sensor module 1 and is enclosed on the one side by components 3, 4, 5, 6, 7 and on the other side by the inner peripheral wall of sensor housing 2. Converter element 3 is selected in terms of its size so that it does not project into the conduit. As is likewise evident from FIGS. 1 and 2, converter element 3, insulating members 4, and the first and the second securing bolt 6, 7 are embodied as symmetrical components, which greatly reduces or in fact entirely precludes the possibility of incorrect assembly of these components in and on sensor housing 1.

Figure 3A:
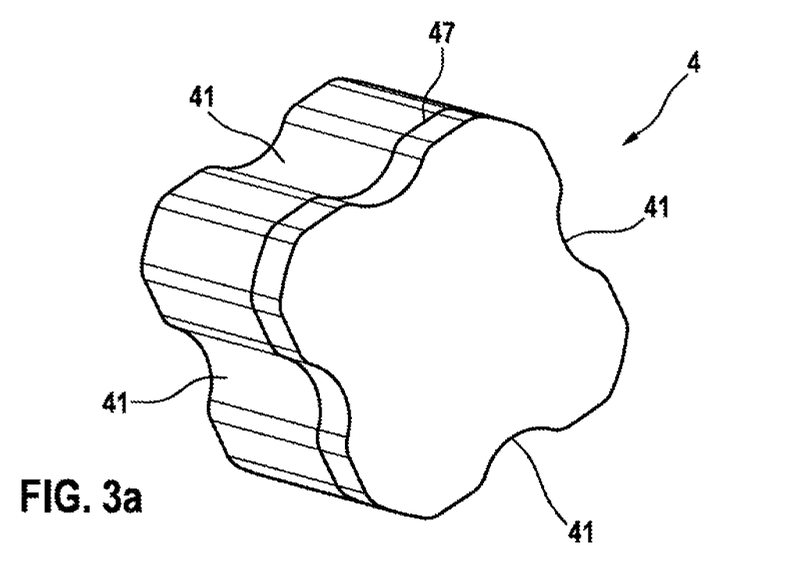
FIG. 3a is a perspective view of an insulating member of the sensor module shown in FIGS. 1 and 2.
Figure 3B:
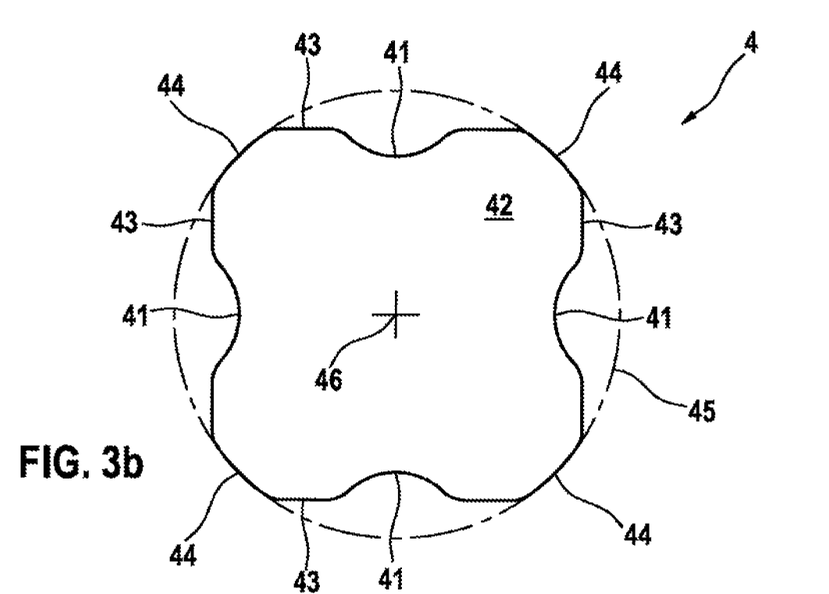

FIG. 3a is a perspective view of an insulating member 4 according to the preferred embodiment of sensor module 1 according to the present invention, and FIG. 3b is a plan view of insulating member 4. Insulating member 4 is made up of two preferably flat base surfaces 42 and four side surfaces 43 that in principle are straight. A respective semicircular recess 41 is provided on the outer periphery of insulating member 4, i.e., in each of side surfaces 43. Corners 44 of insulating member 4 are rounded off in such a way that their rounding lies on a common circle 45 whose center 46 is preferably located at the center of base surfaces 42 of insulating member 4. In this embodiment, insulating member 4 furthermore has a mold separation setback 47 provided for production-engineering reasons when the ceramic insulating member 4 is manufactured using the CIM method. Alternatively thereto, mold separation setback 47 can be omitted if insulating member 4 is manufactured, for example, with a pressing method.

Lastly, FIG. 4 is a partly sectioned perspective view of a portion of pressure-measuring glow plug 9 that encompasses the preferred embodiment of sensor module 1 according to the present invention. As is evident from FIG. 4, pressure-measuring glow plug 9 is made up of a two-part plug housing 91 in which, besides sensor module 1, an electronics module 92 and a glow element 93 are disposed, glow element 93 projecting at least in part out of pressure-measuring glow plug 9 toward the combustion chamber (not shown). Glow element 93 is disposed in a holding tube 95 that is mounted axially movably in plug housing 91. Glow element 93 is furthermore electrically connected via a wire connection to a connector bolt 96 that is in turn connected to electronics module 92 via a contacting system 94 in the form of a contact wire. In order to reduce installation space in the context of pressure-measuring glow plug 9, contacting system 94 is routed inside sensor module 1 in the aforementioned conduit that is enclosed on the one side by components 3, 4, 5, 6, 7 and on the other side by the inner peripheral wall of sensor housing 2. The result is that sensor module 1 and sensor housing 2 can be inserted directly into plug housing 91 with no need for a contacting system, in the form of cables, to extend between it and plug housing 91. Connector bolt 96 is likewise fixedly disposed in holding tube 95; a combustion-chamber-remote end of connector bolt 96, which is connected to contacting system 94, projects at least in part out of holding part 95. The combustion-chamber-remote end of connector bolt 96 is adapted in such a way that it is disposed movably in through bore 62 of first securing bolt 6 and is mechanically in contact with combustion-chamber-side insulating member 4.

When pressure-measuring glow plug 9 is used in a combustion chamber, an elevation in the combustion chamber pressure then displaces glow element 93, and thus connector bolt 96 via holding tube 95, in an axial direction, so that a force is exerted via combustion-chamber-side insulating member 4 on converter element 3. This force is converted by converter element 3 into a charge signal that is transferred via sensor cable 8 to electronics module 92. The combustion chamber pressure can thereby be measured in a space-saving manner using a pressure-measuring glow plug 9 that furthermore performs its glow function by way of glow element 93. The pressure to be measured is consequently transferred, upon encountering pressure-measuring glow plug 9 and glow element 93, inside the components thereof as a force signal to sensor module 1, where the force signal is converted by piezoelectric converter element 3 into a charge signal, the charge signal here being the charge difference between the two potentials of converter element 3. An evaluation circuit, which can be implemented by electronics module 92, then converts the charge signal into a pressure-proportional voltage signal.

Further areas of application are also possible as uses for a sensor module 1 according to the present invention and a pressure-measuring glow plug 9 equipped therewith, for example for a fuel heater such as an ethanol heater in a flex starting system, or any form of electrical tubular heating element in which a non-insulated heating resistor is embedded in a powder packing. Alternatively thereto, sensor module 1 can also be utilized in a standalone combustion chamber pressure sensor.

What is claimed is:

1. A sensor module comprising:
   a sensor housing;
   at least one piezoelectric converter element that is disposed in the sensor housing; and
   at least one insulating member that is disposed in the sensor housing alongside the converter element, the insulating member having on its outer periphery at least one recess in which a contacting system of the converter element extends, wherein the at least one recess is shaped as a semicircular recess and is provided on each side of the insulating member,
   wherein the contacting system includes a contact plate and a contact arm, wherein the contact plate abuts a base surface of the converter element and the contact arm is disposed in a recess of the at least one recess of the insulating member.

2. The sensor module as recited in claim 1, wherein the insulating member has a substantially square shape having a recess on each side so that a symmetrical shape for the insulating member is provided, the contacting system of the converter element extending in two recesses.

3. The sensor module as recited in claim 2, further comprising:
   at least one contact element disposed between the insulating member and converter element and being connected to the contacting system.

4. The sensor module as recited in claim 1, wherein the recess has a rounded shape.

5. The sensor module as recited in claim 1, wherein the converter element has a substantially cuboidal shape.

6. The sensor module as recited in claim 1, wherein the insulating member is made of a ceramic material.

7. The sensor module as recited in claim 1, wherein the insulting member is made of aluminum oxide.

8. The sensor module as recited in claim 1, wherein the sensor housing has a hollow-cylindrical shape and a cover element at each of its ends, the cover element having at least one recess on its outer periphery and securing the insulating member/converter element unit.

9. The sensor module as recited in claim 1, further comprising:
a further insulating member, wherein the converter element is disposed between the insulating member and the further insulating member, the further insulating member being provided for energy transfer to the converter element.

10. The sensor module as recited in claim 1, wherein the insulating member is implemented by way of a cold-pressing operation or a CIM method.

11. A sensor module comprising:
a sensor housing;
at least one piezoelectric converter element that is disposed in the sensor housing; and
at least one insulating member that is disposed in the sensor housing alongside the converter element, the insulating member having on its outer periphery at least one recess in which a contacting system of the converter element extends,
wherein the insulating member has a substantially square shape having a recess on each side so that a symmetrical shape for the insulating member is provided, the contacting system of the converter element extending in two recesses,
wherein the insulating member has rounded corners, rounding profiles of the corners lying on the same circumference.

12. A pressure-measuring glow plug comprising:
a housing;
an electronics module disposed in the housing;
a sensor module including a sensor housing, at least one piezoelectric converter element that is disposed in the sensor housing, and at least one insulating member that is disposed in the sensor housing alongside the converter element, the insulating member having on its outer periphery at least one recess in which a contacting system of the converter element extends, wherein the at least one recess is shaped as a semicircular recess,
the sensor module being disposed in the housing, wherein the sensor module has a cover element at each of its end, the cover element having at least one recess on its outer periphery and securing the insulating member/converter element unit; and
a glow element that is disposed at least in part outside the housing and is mechanically connected to the sensor module;
wherein a contacting system including a contact wire between the glow element and electronics module extends at least in part in an internally peripheral conduit of the sensor module which is constituted by a respective externally peripheral recess of at least the cover element and insulating member.

* * * * *